United States Patent [19]
Criswell

[11] Patent Number: 5,704,748
[45] Date of Patent: Jan. 6, 1998

[54] SELF-LOCKING MACHINE SCREW

[76] Inventor: Richard Criswell, 27727 Tiara Vista Rd., Temecula, Calif. 92582

[21] Appl. No.: 717,707

[22] Filed: Sep. 23, 1996

[51] Int. Cl.[6] ............................. F16B 39/22; F16B 39/34
[52] U.S. Cl. .................... 411/304; 411/299; 411/941.1
[58] Field of Search ................................. 411/299, 300, 411/304, 322, 941, 941.1

[56] References Cited

U.S. PATENT DOCUMENTS

| Re. 23,878 | 9/1954 | Burdick | 411/304 |
|---|---|---|---|
| 1,804,348 | 5/1931 | Kubacki | 411/304 |
| 3,149,654 | 9/1964 | Podell | 411/304 |
| 3,182,702 | 5/1965 | Nason et al. | 411/304 |
| 3,203,041 | 8/1965 | Beuter et al. | 411/304 X |
| 3,306,330 | 2/1967 | Wallace | 411/304 |

FOREIGN PATENT DOCUMENTS

| 672157 | 12/1929 | France | 411/299 |
|---|---|---|---|

Primary Examiner—Neill R. Wilson
Attorney, Agent, or Firm—Allen A. Dicke, Jr.

[57] ABSTRACT

A machine screw has a recess in its body extending from the threaded end into the body. The recess intersects the threads. A tang slot extends across the end of the machine screw body. A locking member is in the recess and the tang of the locking member is in the tang slot. The locking member includes a spring which extends into the thread space so that, when the machine screw is screwed into a threaded part, the spring is deflected by the threaded part to releasably lock the machine screw in place.

26 Claims, 3 Drawing Sheets

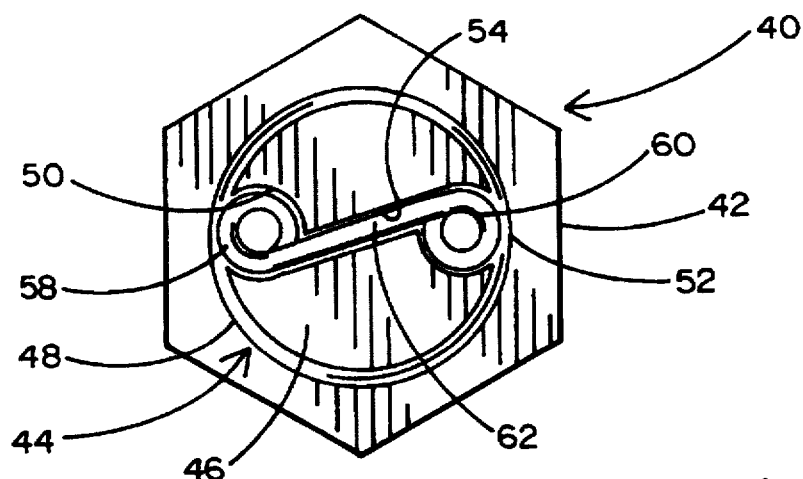
FIG. 4
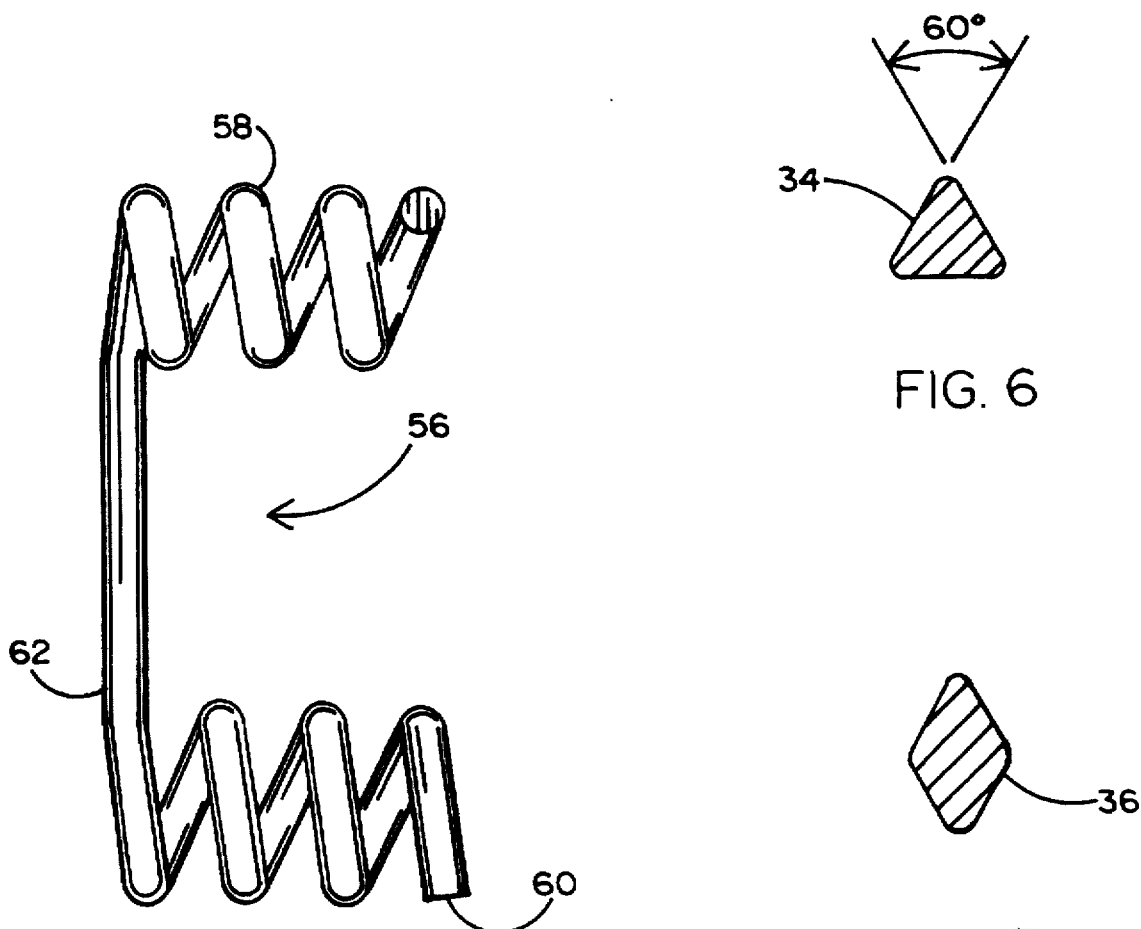
FIG. 5
FIG. 6
FIG. 7

SELF-LOCKING MACHINE SCREW

FIELD OF THE INVENTION

This invention is directed to a machine screw configuration and its locking spring, which may be made of metal and which provides self-locking characteristics to the machine screw even in high-temperature environments.

BACKGROUND OF THE INVENTION

Machine screws are used in mechanical structures to hold parts together. In order to provide some resistance to vibration, the machine screws must be locked in place. A conventional way to lock machine screws in place is to employ lock washers under the heads. This has the disadvantage of cutting up the surface of the associated structure when the machine screw is removed for disassembly of the parts. Another common way in which machine screws were releasably locked in place without damage to the part is by using a nylon plug inserted into a hole in the threaded body of the machine screw. When the machine screw is threaded into place, the nylon deforms to accommodate the threads. The creep of the deformed nylon maintains pressure on the threads to provide releasable locking of the machine screw in place.

Nylon is a thermoplastic synthetic polymer composition material so that, when it is heated, it becomes soft. Thus, in applications which include the presence of significant heat, nylon locked machine screws cannot be relied upon. There is need for a self-locking machine screw which can be employed in all environments, including high-temperature environments as a simple replacement of machine screw basis without requiring machining of any of the parts with which the machine screw is mated.

SUMMARY OF THE INVENTION

This invention is directed to a self-locking machine screw which includes a recess in the body of the machine screw extending from the end of the machine screw and intersecting the outer surface. A tang slot joins the recess. An open coil locking member having a tang is inserted into the recess with the tang in the tang slot. The locking member extends outward from the machine screw thread surfaces so that the locking member must be deflected when the machine screw is screwed into a threaded opening in machine structure to lock the machine screw in position.

It is, thus, a purpose and advantage of this invention to provide a self-locking machine screw which can be employed in places where machine screw locking at high temperatures is required.

It is another purpose and advantage of this invention to provide a self-locking machine screw which does not require machining of any of the parts into which it is screwed to obtain locking of the machine screw in position.

It is a further purpose and advantage of this invention to provide a self-locking machine screw which can be created by swaging and cold-rolling of the machine screw to maximize machine screw materials properties.

It is a further purpose and advantage of this invention to provide a self-locking machine screw which serves as a simple replacement for presently used nylon-locked screws without additional modification of the parts so that replacement of nylon-locked screws may be readily accomplished in the field, as well as use in original manufacture.

Other purposes and advantages of this invention will become apparent from a study of the following portion of the specification, the claims and the attached drawings.

BRIEF DESCRIPTION OF THE DRAWINGS

FIG. 4 is an end view of a second preferred embodiment of the self-locking machine screw of this invention.

FIG. 5 is an enlarged side-elevational view of the locking member used in the embodiment of FIG. 4.

FIG. 6 is a cross section of a first preferred embodiment of the locking member.

FIG. 7 is a cross section of a second preferred embodiment of the locking member.

DESCRIPTION OF THE PREFERRED EMBODIMENTS

Figure 1:
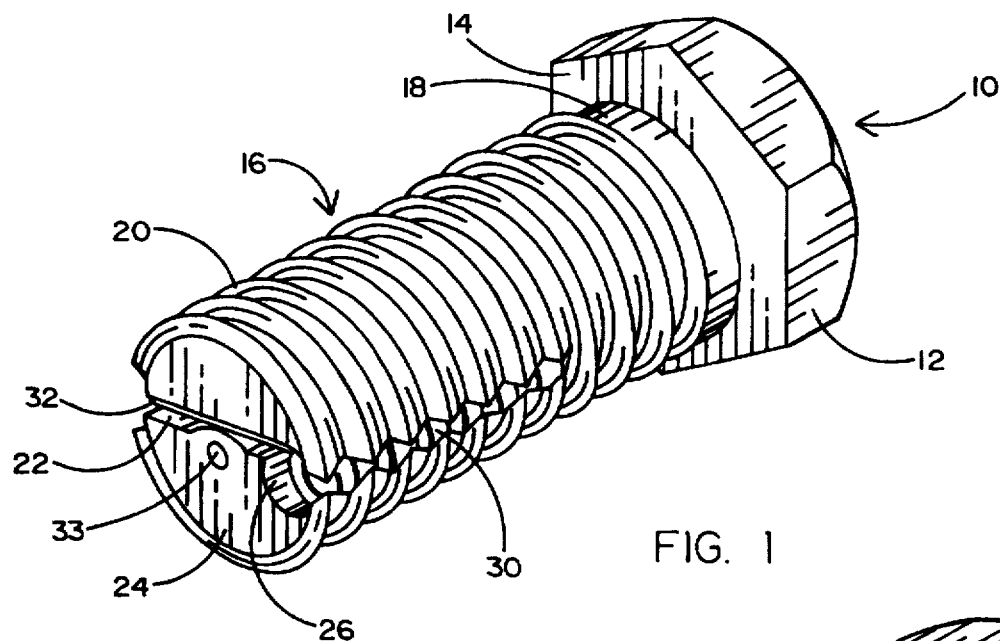
FIG. 1 is a isometric view of the first preferred embodiment of the self-locking machine screw of this invention.
Figure 2:
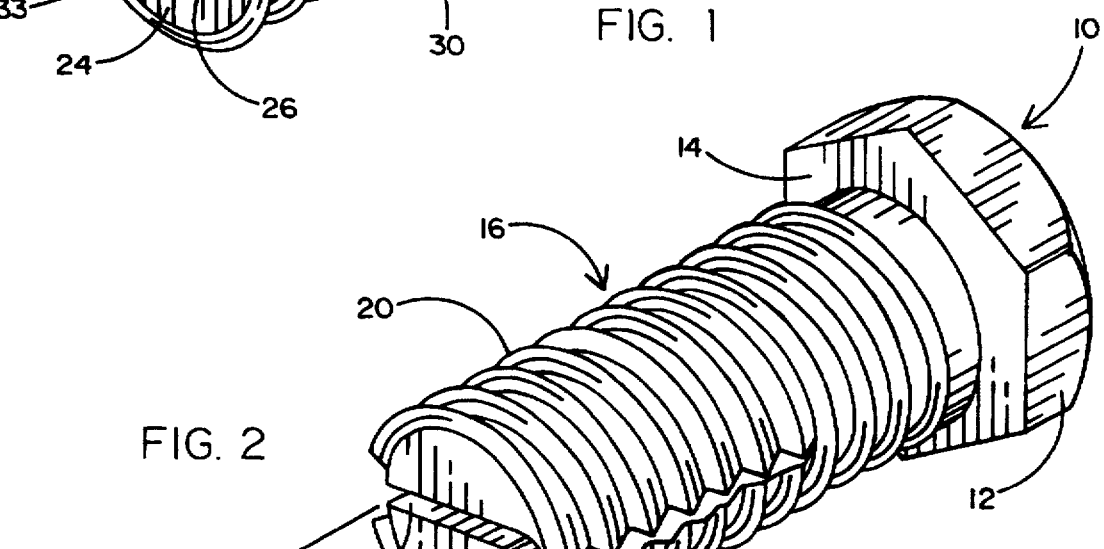
FIG. 2 is an exploded view thereof.
Figure 3:
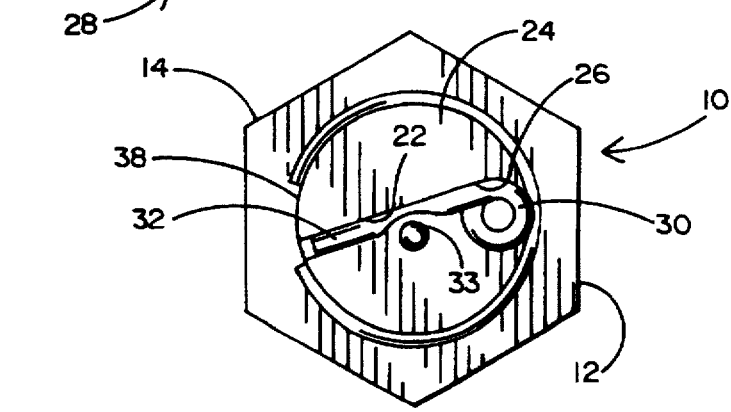
FIG. 3 is a end view thereof.

Machine screw 10 is shown in FIGS. 1, 2 and 3. The machine screw 10 is illustrative of the first preferred embodiment of the self-locking machine screw of this invention. Machine screw 10 has a head 12, which is illustrated as being a hexagonal head for the purposes of installing the machine screw in a threaded part. The head 12 may be of any configuration, including a socket head, which can be engaged by a tightening tool such as a wrench. The head has an under side 14, which is for engagement against parts to be fastened together. The body 16 of the machine screw 10 is of an appropriate length to fasten together the parts to be attached. The body may include an unthreaded shank 18 and, of course, has a section beyond the shank which carries threads 20. The machine screw is intended to fasten two parts together. The upper part against which the head engages has a clearance hole in it, and the lower part has threads which are engaged by the threads 20 of the machine screw. Such is a conventional machine screw.

The machine screw 10 has a slot 22 extending across the end 24 of the machine screw. Furthermore, recess 26 is formed in the threaded part of the machine screw. The recess 26 extends parallel to the central axis of the machine screw. The recess 26 extends in the radially outward direction sufficiently far to intersect the threaded surfaces, as shown in FIGS. 1, 2 and 3. Recess 26 is preferably a circular cylinder and its surface is preferably tangent to the major thread diameter.

Locking member 28 is a coil spring 30 with a tang 32. The coil spring and tang are sized to respectively enter into recess 26 and slot 22, as shown in FIGS. 1 and 3. The pitch of the coil spring; that is, the helical lead from one coil to the next in the locking members of FIGS. 2 and 5 is substantially equal to the pitch of the threads on the machine screw in which it is installed. Thus, the coil spring portion of the locking member is an open wound spring, as seen in FIGS. 2 and 5. It is important to note that the coil spring 30 of the locking member 28 is coiled in the clockwise direction as it goes away from the viewer in FIGS. 1, 2 and 3. The coils of the coil spring are within the recess 26, but extend substantially to the major diameter of the thread form of the machine screw because the recess 26 preferably extends all the way to the major thread diameter. This means that the entire thread cross section at the recess is available for locking. The coils of the locking member extend out into the region between the major and minor diameters.

The material of the locking member 28 is preferably metallic, particularly in applications where high-temperature functioning is required. Furthermore, there is machinery for winding metal wire into springlike coils, even including tangs. Thus, special machinery would not be required. However, where the installation is not expected to require high-temperature performance, thermoplastic materials may be adequate. In addition, thermosetting plastics would be useful in some applications where moderate temperatures are encountered beyond those tolerable for thermoplastic materials. Thus, the preferred material is metal because it can be readily formed to the desired configuration, and it withstands the maximum temperatures.

The slot 22 and recess 26 are sufficiently deep so that the locking member is limited in its insertion depth by the tang in its slot. The locking member spring does not bottom out in its recess to assure free flexure of the spring during locking. The locking member is retained in place by having a portion of the metal of the slot 22 staked over. The staking punch mark 33 is seen in FIGS. 1 and 3. The staking punch partly closes the slot 22 over the tang 32 to hold the locking member 28 in place. Also, when the locking member 28 is installed in its recess, the first two threads from the end away from the head are beyond the locking member. This means that the machine screw can be started into its threads for substantially two turns to properly engage the machine screw before the locking member engages. As the machine screw is tightened into its threaded hole, clockwise turning of the machine screw causes the coil spring to tighten in its coil direction and, thus, reduce in diameter. When the unlocking torque is applied, the spring 30 tends to uncoil, thus providing greater torque resistance to unscrewing than the original tightening torque charged to the locking member.

The coil spring 30 and the locking member 28 may have a circular cross section, as shown in FIGS. 1, 2 and 3. The pitch of the coil spring 30 is preferably the same as the pitch of the threads in the machine screw, or multiples thereof. This means that, as the machine screw is tightened into a threaded hole, the threads in the hole cause the coil spring to lengthen as the threads turn in the threaded hole engaged between the coils of the coil spring. A coil wire of circular cross section would result in point contact with the threaded part into which the machine screw is tightened. Line contact can be achieved by using a triangular wire cross section 34, as shown in FIG. 6, or a trapezoidal wire cross section 36, as shown in FIG. 7, in winding the coil or the locking member. These cross sections have the same peak angle as the thread, usually 60 degrees.

The use of a helical spring, as illustrated in FIGS. 2 and 5, is useful and accomplishes the result of substantial bolt locking and a higher unscrewing torque than installation torque. If the locking member is wound as a simple coil spring of round wire section, as taught in FIGS. 2 and 5, it appears as a close, but not tightly wound compression spring. The pitch of the coils is configured to match that of the host screw in order to successively engage in the host female thread. Since the spring is being compressed radially across its diameter, the reaction locus for the compression force will be half pitch offset axially from the diametric reaction. This causes twist in the spring wire between the contact points. This offset is significant within the available geometry for this locking system. The resulting normal or locking force is reduced from that of a diametric reaction to the cosine of the helix angle for any compression force applied. For a typical locking member, the angle is approximately 25 degrees and can be in excess of 45 degrees for heavier gage wire or coarse thread fastener.

Figure 8:
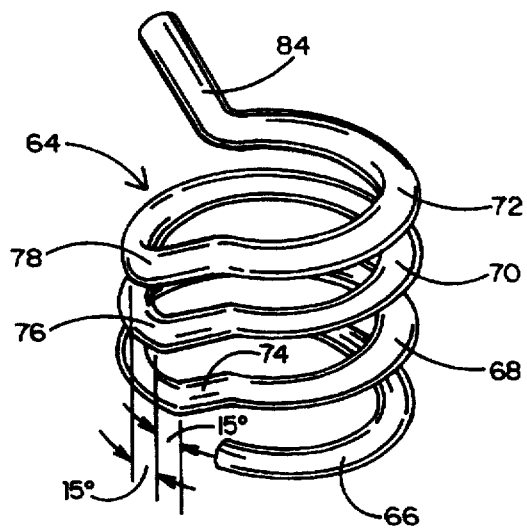
FIG. 8 is an isometric view of another preferred embodiment of the locking member.
Figure 9:
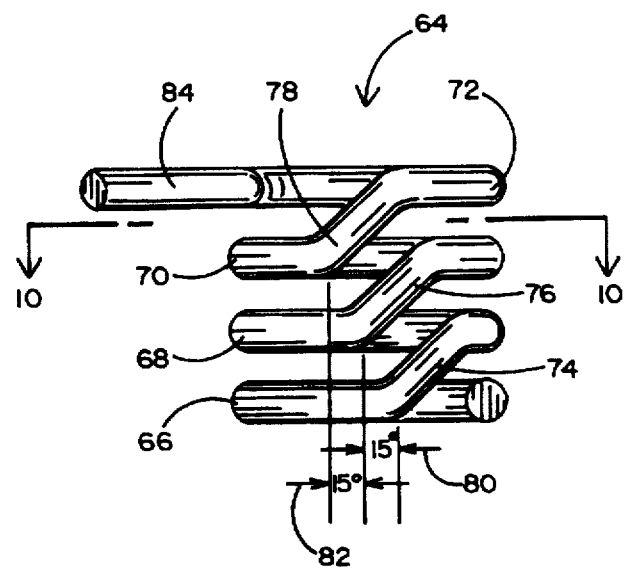
FIG. 9 is a side-elevational view of the locking member of FIG. 8.

A locking member configuration which overcomes this problem to thus increase the available locking torque is shown in FIGS. 8 and 9. A locking member 64 may be wound of round wire or wire that may be shaped as shown in FIGS. 6 and 7. The locking member 64 is wound as a circular coil, one with a zero helix angle, for approximately 240 degrees. At that point, it is bent to offset the next similar coil. The offset is equal to the spring pitch. First, second, third and fourth coils 66, 68, 70 and 72 are illustrated as portions of a torus. These portions extend for about 240 degrees, and angular offsets of about 105 degrees connect the successive toroidal windings. Angular offsets 74, 76 and 78 are shown. The progressive spacing of the offsets is shown by dimensions 80 and 82. The progressive angularity of the offsets may be about 15 degrees and is determined by the amount of windup from unstressed to stressed condition. The toroidal portion of the coil turn is about 240 degrees and the angular offset is about 105 degrees. This makes the progressive angularity of the offsets, about 15 degrees, in the lag direction. This positions each offset 15 degrees clockwise in the lag direction with respect to the one above when looking in the top-to-bottom direction in the unstressed condition, as seen in FIG. 8.

Figure 10:
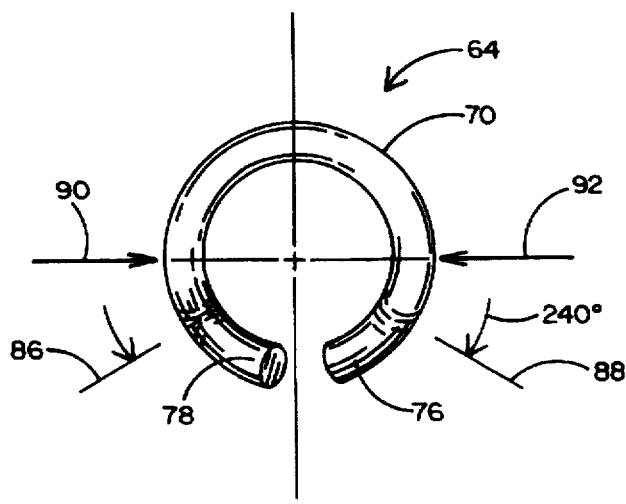
FIG. 10 is a downwardly looking section on the topmost complete coil of the locking member shown in FIG. 9.

FIG. 10 is a sectional view looking downward in the locking member 64 along the line 10—10 of FIG. 9. The offset 78 is broken away in the turned-up direction, and offset 76 is broken away in the turned-down direction. The angle between the angular reference lines 86 and 88 is 120 degrees, as discussed above. The reason for the toroidal structure is the positioning of the toroid so that the force on the spring portion of the locking member is strictly radially of the bolt. The force on the particular toroidal section 70 is represented by force arrows 90 and 92. It is thus seen that, with this configuration, there is no twisting force on the locking member so that the bending is purely radial of the bolt and radial of the locking member. The direction of the force arrows 90 and 92 is parallel to the orientation of the tang 84, which lies across the center line of the machine screw. The 240 degrees of the torus plus the 105 degrees of the angular offset add up to a 345 degree angle, and the remaining 15 degrees of the total circle becomes the offsets 80 and 82 of FIG. 9. Thus, the lag angle of one turn is 345 degrees. This is the bending size which results in the 15 degrees lag in each turn.

Locking member 64 has a tang 84 which extends outward from the general toroidal diameter to lie in the slot 20. The tang positions the toroidal portion of the coil at the exposed side of the recess 26. The locking member 64 is made of resilient material such as spring steel and has spacing between the circumferential toroids, as seen in FIGS. 8 and 9. The spacing between toroids is preferably the same as the lead on the threads 20. The locking member 64 is configured to provide an optimum radial reaction path 90–92 to the compressive bending load being applied to the locking member.

The machine screw 10 is preferably cold formed to improve its metallurgical characteristics. Cold heading and cold thread rolling is well known. It is expected that the locking member recess 26 and the tang slot 22 can be cold formed. It is anticipated that, in cold rolling the threads on the machine screw body, it may be helpful to have a shallow relief 38 across from the recess 26 to provide balance on the rolling dies during the cold rolling of the threads. It is expected that the circumferential length of the shallow recess 38 is approximately equal to the circumferential length of the recess 26 at the root diameter of the threads 20. The radial depth of the recess 26 is only down to the thread root diameter.

When the machine screw 10 is tightened into a threaded part, the coil spring 30 of locking member 28 or the toroids of locking member 64 engages the threads in the threaded part, and the locking member is deflected by those threads. It is this deflection which causes force by the locking member onto the threaded part. The force tends to releasably lock the machine screw in place. Sufficient loosening torque can overcome this locking so that the parts, including the machine screw and its locking member are reusable.

The machine screw 40, shown in FIG. 4, is a second preferred embodiment of the self-locking machine screw of this invention. The machine screw 40 has all of the basic elements of the machine screw 10, shown in FIGS. 1, 2 and 3. The machine screw 40 has a head 42 and a body 44. The body 44 terminates in an end 46. From its end 46 toward its head, it is provided with screw threads 48.

The machine screw 40 has two recesses 50 and 52 formed therein from the end 46 toward the head. These recesses are substantially cylindrical, and like recess 26, they intersect the screw threads 48. In fact, the cylinder of the recess is preferably tangent to the cylinder defined by the major screw thread diameter, as seen in FIG. 4. Diametrically connected the recesses 50 and 52 is tang slot 54.

Locking member 56 is shown enlarged in FIG. 5. It is formed of two coil springs 58 and 60. The coil springs are joined by a tang 62. The locking member 56 is sized to fit into the recesses 50 and 52, and the tang 62 is sized to fit across the tang slot 54. The length of the coil springs 58 and 60 is related to the depth of the recesses, and the tang slot 54 is sufficiently deep so that, when the locking member is installed into the end of the machine screw, as shown in FIG. 4, the locking members do not bottom out. With the tang in the bottom of its slot, the locking member and tang are approximately two threads within the machine screw beyond the end 46. This means that two threads closest to the end 46 of the machine screw are beyond the locking member in the direction away from the head. This permits the machine screw to be started into a threaded part for those two threads before the locking member takes effect.

It should be noted that both of the coil springs 58 and 60 are coiled in the clockwise direction going away, as seen in FIG. 4. It will be appreciated that this causes the coil springs to tighten on themselves and thus reduce the coil diameter when the machine screw 40 is introduced into a threaded part. Conversely, when the machine screw 40 is unscrewed from the threaded part, the coil springs tend to unwind making them larger, thus causing greater holding force. The material is preferably metal, but thermosetting synthetic polymer composition material may be useful in some applications, while thermoplastic synthetic polymer composition material may be useful in applications which are not expected to require holding at a raised temperature, similar to the criteria discussed above. This applies to each of the locking members 12, 56 and 64. It is expected that, if synthetic polymer composition material is used, the locking members would be molded instead of wound. The cross section of the wire of the locking member can be circular, as shown in FIG. 5, equilateral triangular, as shown in FIG. 6, or trapezoidal, as shown in FIG. 7. The use of the cross sections of FIG. 6 or FIG. 7 in the wire used for winding the springs of the locking member permits line contact, which reduces bearing stress on the part into which the machine screw is threaded. The coils of the locking member 56 could be configured as shown in FIGS. 8 and 9. Thus, the locking member 64 of FIGS. 8 and 9 could be formed with a double coil and a single tang, similar to that shown in FIG. 5. The locking member 64 has higher performance than the simple coil spring locking member 28, and thus it is preferred for high performance applications where the greater difficulty in manufacturing the special shape of locking member 64 could be advantageous. It can be appreciated that the structures 10 and 40, which have been called "machine screws," can be equally well called "bolts," especially in the larger sizes.

This invention has been described in its presently preferred best mode, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A self-locking machine screw comprising:

a male substantially cylindrical body having a radius and having a first end and a second end defining the length of said body, said body having screw threads having a root diameter, said screw threads extending at least a portion of the length of said body from said first end toward said second end;

a recess in said first end of said body, said recess having walls extending generally lengthwise with respect to the length of said body and intersecting said screw threads so that said recess is radially partially exposed, said recess being more narrow at said root diameter than at a smaller radius, a stop wall;

a resilient metallic locking member in said recess, said metallic locking member having a plurality of thread engagement surfaces thereon sized and shaped to engage on thread surfaces in a threaded hole, said metallic locking member being positioned in said recess so that at least a portion of said engagement surfaces are exposed out of said recess so that when said machine screw is turned into a threaded hole, a portion of said thread engagement surfaces on said resilient metallic locking member which is exposed from said recess is resiliently deflected to provide a controlled frictional drag of prevailing torque that resists inadvertent turning of the screw; and said metallic locking member engaging on said stop wall to inhibit rotation of said metallic locking member in said recess.

2. The machine screw of claim 1 wherein said machine screw is metallic.

3. The machine screw of claim 1 wherein both said machine screw and said locking member are metallic.

4. The machine screw of claim 3 wherein said recess is deeper than the length of said locking member so that said locking member lies within said recess sufficiently far so that substantially two threads on said bolt extend in a direction away from said first end.

5. The machine screw of claim 4 wherein said locking member is a coil spring.

6. The machine screw of claim 5 wherein said walls of said recess define a substantially cylindrical recess and said locking member is a coil spring within said recess.

7. The machine screw of claim 1 wherein said locking member is a coil spring.

8. The machine screw of claim 7 wherein said walls of said recess define a substantially cylindrical recess and said locking member is a coil spring within said recess.

9. A self-locking machine screw comprising:
- a male substantially cylindrical screw-threaded body having a first end and a second end with said screw threads extending from said first end toward said second end;
- a substantially cylindrical recess in said first end of said body, said recess having walls intersecting said screw threads so that said recess is partially exposed;
- a coil spring locking member within said recess, a tang on said locking member extending away from said coil portion of said locking member and a tang slot in said body to receive said tang to position and retain said coil spring in said recess so that when said machine screw is turned into a threaded hole, the portion of said locking member which is exposed from said recess is deflected to provide a controlled frictional drag of prevailing torque that resists inadvertent turning of the screw.

10. The machine screw of claim 9 wherein said recess and said tang slot are sufficiently deep so that said coil spring and said tang are substantially two threads away from said end.

11. A self-locking machine screw comprising:
- a male substantially cylindrical screw-threaded body having a first end and a second end with said screw threads extending from said first end toward said second end;
- a substantially cylindrical recess in said first end of said body, said recess having walls intersecting said screw threads so that said recess is partially exposed;
- a coil spring locking member within said recess, said spring being wound of wire having two surfaces substantially 60 degrees with respect to each other and said surfaces face substantially the same way as said screw threads on said machine screw body so that when said machine screw is turned into a threaded hole, the portion of said locking member which is exposed from said recess is deflected to provide a controlled frictional drag of prevailing torque that resists inadvertent turning of the screw.

12. A machine screw comprising:
- a body, said body being substantially cylindrical, said body having a first end, said body having a head opposite said first end, said body having screw threads on the exterior surface thereof extending from said first end toward said head;
- a recess in said body open to said first end of said body, said recess having an interior surface which intersects the surfaces of said screw threads, said recess being wider radially inward from the root diameter of said screw threads, a stop wall in said body at said recess;
- a resilient metallic locking member in said recess, said locking member having thread engaging surfaces thereon shaped to engage threads in a part into which said machine screw is threaded, said resilient metallic locking member being resiliently urged in a direction to be exposed at said screw threads so that when said machine screw is screwed into a threaded hole in a part, said locking member is deflected to resist removal of said machine screw from the threaded part, and said resilient metallic locking member engaging said stop wall to inhibit rotation of said locking member when said bolt is threaded into a part.

13. A machine screw comprising:
- a body, said body being substantially cylindrical, said body having a first end, said body having a head opposite said first end, said body having screw threads on the exterior surface thereof extending from said first end toward said head;
- a substantially cylindrical recess in said body open to said first end of said body, said recess having an interior surface which intersects the surfaces of said screw threads;
- a metallic spring locking member in said recess, said spring being wound of metallic wire which has two surfaces positioned at substantially 60 degrees with respect to each other, said locking member being resiliently urged in a direction to be exposed at said screw threads so that when said machine screw is screwed into a threaded hole in a part, said locking member is deflected to resist removal of said machine screw from the threaded part.

14. The machine screw of claim 13 wherein said spring is wound of metallic wire which is substantially an equilateral triangle in cross section, with one of the corners of said triangle being directed toward the exterior of said coil spring.

15. The machine screw of claim 13 wherein said spring is wound of metallic wire with spaces between successive turns of wire.

16. A machine screw comprising:
- a body, said body being substantially cylindrical, said body having a first end, said body having a head opposite said first end, said body having screw threads on the exterior surface thereof extending from said first end toward said head;
- a recess in said body open to said first end of said body, said recess having an interior surface which intersects the surfaces, a stop wall in said body at said recess of said screw threads;
- a metallic spring locking member in said recess, said spring being wound as a series of spaced partial toroidal coils with offsets between the toroidal coils, said locking member having thread engaging surfaces thereon shaped to engage threads in a part into which said machine screw is threaded, said resilient metallic locking member being resiliently urged in a direction to be exposed at said screw threads so that when said machine screw is screwed into a threaded hole in a part, said locking member is deflected to resist removal of said machine screw from the threaded part, and said resilient metallic locking member engaging said stop wall to inhibit rotation of said locking member when said bolt is threaded into a part.

17. The machine screw of claim 16 wherein successive partial toroidal turns of said spring are rotatably spaced with respect to each other.

18. The machine screw of claim 16 wherein said coil spring is shorter than the length of said recess so that two threads on said machine screw extend past said coil spring when said coil spring is in said recess.

19. The machine screw of claim 16 wherein there is a tang on said coil spring and there is a tang slot at least partway across said first end of said machine screw, said tang slot being sized to receive said tang to prevent rotation of said coil spring.

20. A machine screw comprising:
- a body, said body being substantially cylindrical, said body having a first end, said body having a head opposite said first end, said body having screw threads on the exterior surface thereof extending from said first end toward said head;
- a recess in said body open to said first end of said body, said recess having an interior surface which intersects the surfaces, a stop wall in said body at said recess of said screw threads;

a spring locking member in said recess, said spring being shorter than the length of said recess so that substantially two threads on said machine screw extend past said spring when said spring is in said recess, said locking member having thread engaging surfaces thereon shaped to engage threads in a part into which said machine screw is threaded, said resilient metallic locking member being resiliently urged in a direction to be exposed at said screw threads so that when said machine screw is screwed into a threaded hole in a part, said locking member is deflected to resist removal of said machine screw from the threaded part, and said resilient metallic locking member engaging said stop wall to inhibit rotation of said locking member when said bolt is threaded into a part.

21. A machine screw comprising:

a body, said body being substantially cylindrical, said body having a first end, said body having a head opposite said first end, said body having screw threads on the exterior surface thereof extending from said first end toward said head;

a recess in said body open to said first end of said body, said recess having an interior surface which intersects the surfaces, a stop wall in said body at said recess of said screw threads;

a spring locking member in said recess, a tang on said spring and a tang slot at least partway across said machine screw, said tang slot being sized to receive said tang to prevent rotation of said spring, said locking member having thread engaging surfaces thereon shaped to engage threads in a part into which said machine screw is threaded, said resilient metallic locking member being resiliently urged in a direction to be exposed at said screw threads so that when said machine screw is screwed into a threaded hole in a part, said locking member is deflected to resist removal of said machine screw from the threaded part, and said resilient metallic locking member engaging said stop wall to inhibit rotation of said locking member when said bolt is threaded into a part.

22. The machine screw of claim 21 wherein said tang slot and said recess are sufficiently deep and said spring is sufficiently short so that when said tang is in said recess, substantially two threads of said machine screw extend past said spring and past said tang so that said machine screw can be introduced into a threaded part substantially two threads before said spring engages.

23. A machine screw comprising:

a body, said body being substantially cylindrical, said body having a first end, said body having a head opposite said first end, said body having screw threads on the exterior surface thereof extending from said first end toward said head;

two recesses in said body open to said first end of said body, said recesses being substantially diametrically oppositely spaced and each having an interior surface which intersects the surfaces of said screw threads;

a resilient metallic spring locking member, said locking member having two springs thereon respectively positioned within said two recesses, both of said recesses intersecting said threaded surfaces so that both of said springs are positioned for locking said machine screw in a threaded part in said recess, said locking member so that when said machine screw is screwed into a threaded hole in a part, said locking member is deflected to resist removal of said machine screw from the threaded part.

24. The machine screw of claim 23 wherein said springs are connected by a tang and there is a slot across said bolt connecting said recesses, said slot being sized to receive said tang.

25. A machine screw comprising:

a body, said body being substantially cylindrical, said body having a first end, said body having a head opposite said first end, said body having screw threads on the exterior surface thereof extending from said first end toward said head;

a recess in said body open to said first end of said body, said recess having an interior surface which intersects the surfaces of said screw threads;

a locking member in said recess, said locking member being a spring configured to comprise a plurality of connected semi-toroidal turns, so that each turn can provide opposite radial forces at each semi-toroid, said locking member being resiliently urged in a direction to be exposed at said screw threads so that when said machine screw is screwed into a threaded hole in a part, said locking member is deflected to resist removal of said machine screw from the threaded part.

26. The machine screw of claim 25 wherein said spring is a metallic spring formed with the semi-toroidal portion having a non-circular crossection.

* * * * *